United States Patent [19]

Jurus

[11] Patent Number: 4,554,810
[45] Date of Patent: Nov. 26, 1985

[54] DRAW-SPINNING OF INTEGRAL VEHICLE WHEEL RIM AND DISC SEGMENTS

[75] Inventor: Kevin D. Jurus, Lansing, Mich.

[73] Assignee: Motor Wheel Corporation, Lansing, Mich.

[21] Appl. No.: 596,143

[22] Filed: Apr. 2, 1984

[51] Int. Cl.⁴ .................................................. B21D 22/16
[52] U.S. Cl. ............................................. 72/70; 72/83; 72/84; 29/159.1
[58] Field of Search ................... 72/82, 83, 84, 85, 70; 29/159 R, 159.1, 159.01

[56] References Cited

U.S. PATENT DOCUMENTS

| | | |
|---|---|---|
| 3,205,688 | 9/1965 | Paulton . |
| 3,262,191 | 7/1966 | Albertson et al. . |
| 3,823,591 | 7/1974 | Schroder et al. ........................ 72/83 |
| 3,991,598 | 11/1976 | Kraft ........................................ 72/83 |

FOREIGN PATENT DOCUMENTS

| | | | |
|---|---|---|---|
| 535305 | 12/1958 | Belgium | ................................. 72/83 |
| 56-89334 | 7/1981 | Japan | ..................................... 72/83 |

*Primary Examiner*—Lowell A. Larson
*Attorney, Agent, or Firm*—Barnes, Kisselle, Raisch, Choate, Whittemore & Hulbert

[57] ABSTRACT

A method of forming a one-piece vehicle wheel disc and rim segment from a circular blank which includes the steps of clamping the circular blank in a spinning chuck having a mandrel with an outer surface that corresponds to the final desired geometric contour of the rim portion of the disc and rim segment. The periphery of the circular blank is then subjected to a draw spinning operation wherein a first spinning roller is cycled through a number of passes across the blank while the blank is spun by the chuck, and with the drawn portion of the blank being spaced from and unsupported by the mandrel surface.

9 Claims, 4 Drawing Figures

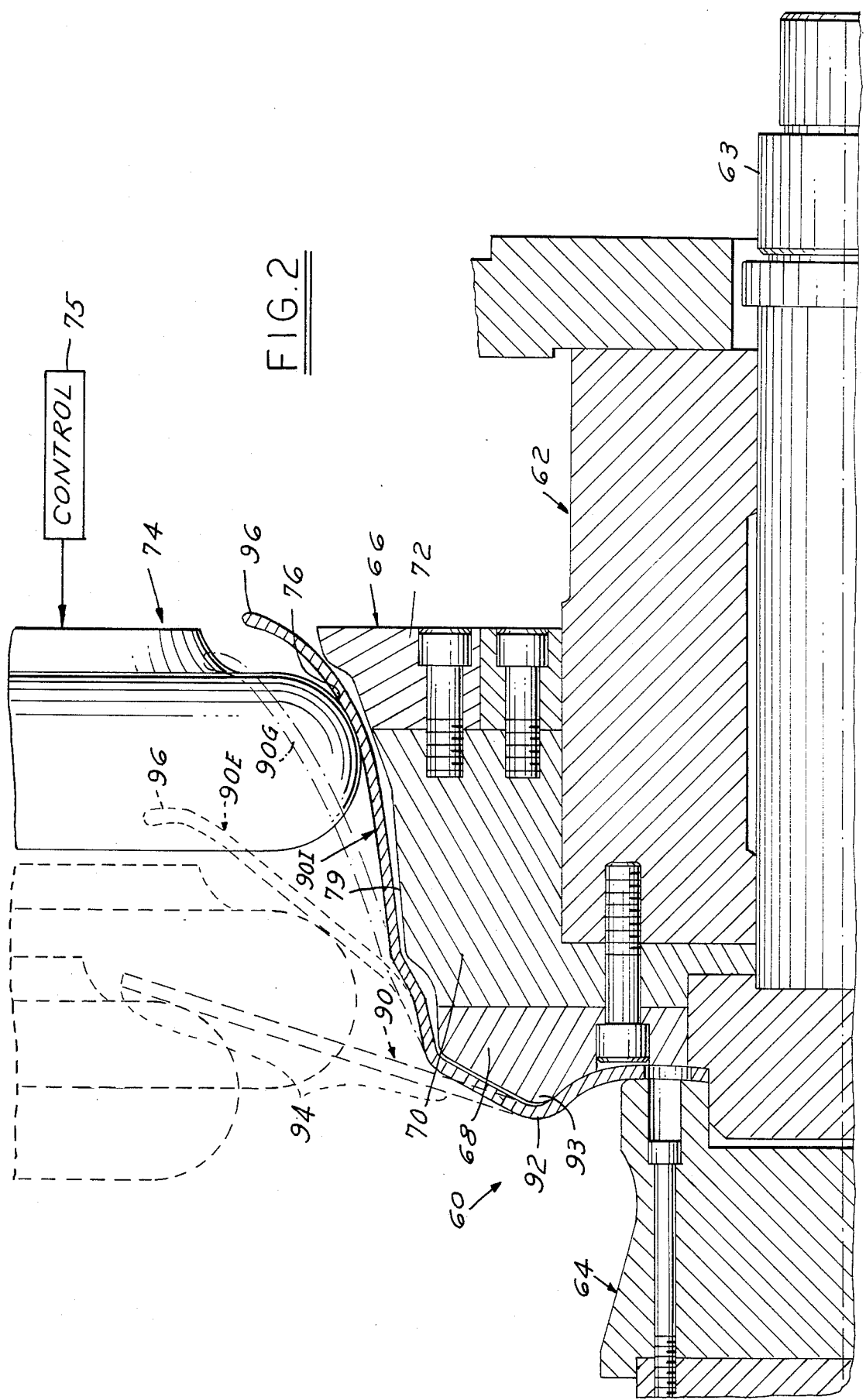

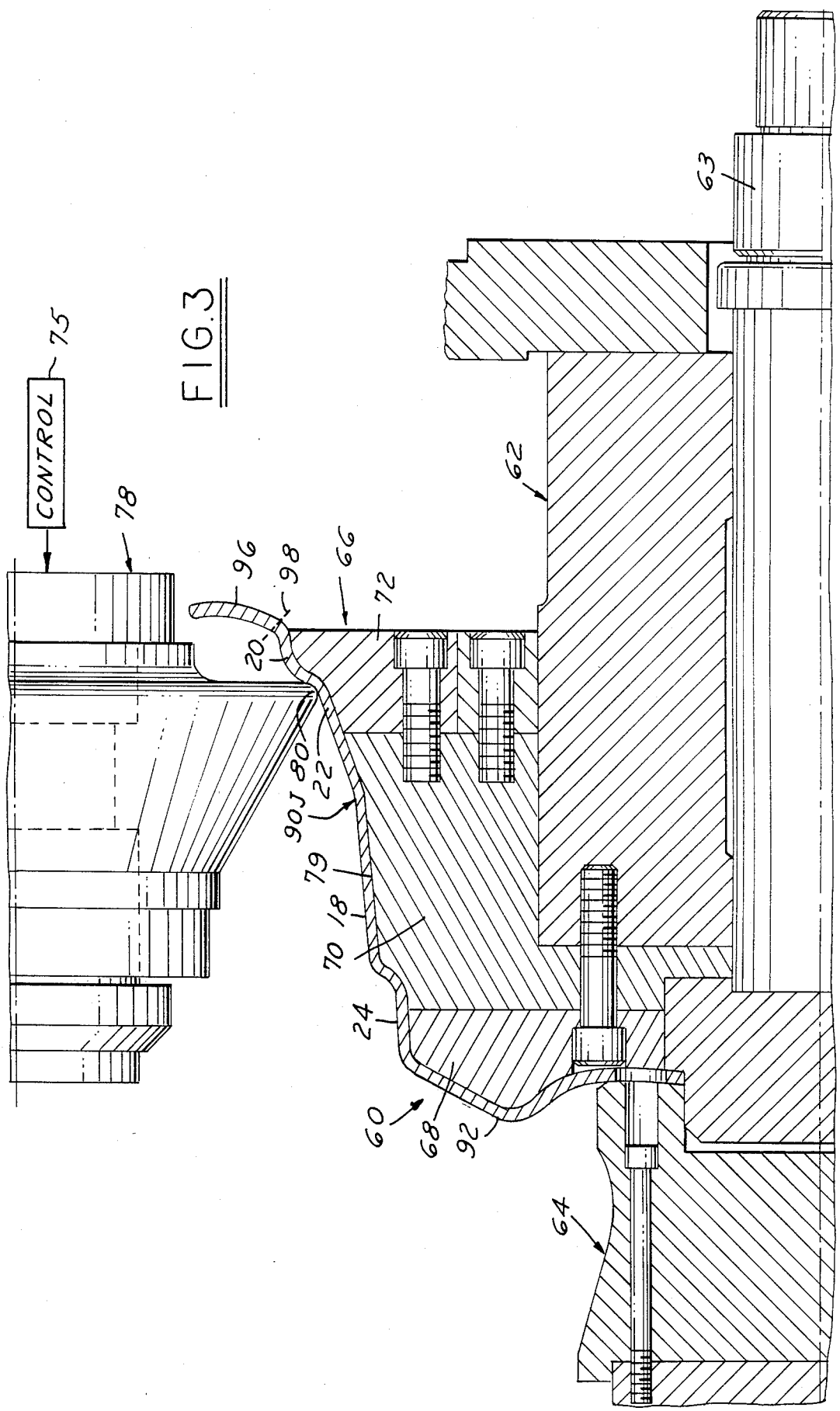

DRAW-SPINNING OF INTEGRAL VEHICLE WHEEL RIM AND DISC SEGMENTS

The present invention is directed to manufacture of vehicle wheels, and more particularly to methods of spin-forming integral rim and disc segments.

The term "draw spinning" is used in its conventional sense in the present application and refers to a spinning operation wherein the stock material of a spinning blank is contacted by one or more rollers and "drawn" so as to reduce the thickness thereof while increasing radial and/or axial length of the blank with respect to the spin axis.

It is conventional in the art to form vehicle wheel discs by draw spinning a circular disc blank against an internal mandrel having the desired disc cross sectional contour. The amount of thickness reduction and alteration of the radial and/or axial dimensions of the blank are limited to that which can be obtained in one spinning pass because reaction forces on the blank interior exerted by the mandrel as the blank is formed thereover, coupled with the forces on the blank exterior by the spinning roller, severely cold works the blank material and causes the material microstructure to set. It has been proposed in the art to spin-form a circular blank in multiple passes while the blank is unsupported by the mandrel. Such "air spinning" operations have been proposed to alter the geometric but not the thickness contours of the blanks. Insofar as is currently known, it has not heretofore been proposed to draw-spin a circular blank so as to obtain a controlled reduction in stock thickness while the blank stock is unsupported by a mandrel.

It is a general object of the present invention to provide a method of manufacturing an integral rim and disc segment for a vehicle wheel assembly which is economical to implement and which produces a wheel segment having an enhanced strength-to-weight ratio. Another and related object of the invention is to provide a method of the described character which may be readily modified for use on a wide variety of disc and rim segment contours.

A further object is to provide an improved integral rim and disc segment for a vehicle wheel assembly having an enhanced strength-to-weight ratio and made in accordance with the method of the present invention.

In accordance with the specific embodiment of the invention herein disclosed, a circular blank of uniform stock thickness is fixtured with its central portion clamped in a spinning chuck and its periphery projecting radially outwardly. The spinning chuck includes a mandrel having an outer surface which corresponds to the desired final geometric interior contour of the rim and disc segment, and the periphery (i.e., the outward bounds of the segment as distinguished from its internal regions or center) of the blank is angled slightly over the mandrel surface, but is spaced axially and radially therefrom.

The periphery of the circular blank is then subjected to a draw spinning operation wherein a first spinning roller is cycled through a number of passes across the blank periphery while the blank is spun by the chuck. During each pass, axial and radial motion of the roller is so controlled as to draw and thin the blank stock while the periphery is spaced from and unsupported by the mandrel surface. After a number of such controlled passes, the stock thickness of the blank periphery is substantially reduced as compared to the starting thickness, and preferably is of substantially uniform thickness. Upon completion of the draw spinning operation, the blank periphery is disposed closely adjacent to, but is still unsupported by, the mandrel surface.

Forming of the wheel rim and disc segment is then completed in a spin-forming operation wherein a second roller is passed over the workpiece so as to form the blank periphery against, and thus at least its interior surface, to the shape of the mandrel surface without appreciably altering the thickness thereof. The result is a wheel segment with a disc portion having the original blank thickness and contour, and an integral rim segment portion having a reduced, substantially uniform thickness contour obtained during the draw spinning operation wherein the drawn portion of the workpiece was spaced from and unsupported by the mandrel surface, and a geometric contour obtained by forming the draw-spun blank periphery against the mandrel surface.

The invention, together with additional objects, features and advantages thereof, will be best understood from the following description, the appended claims and the accompanying drawings in which:

FIGS. 2 and 3 are fragmentary central axial and radial sectional views which illustrate manufacture of a vehicle wheel integral rim and disc segment in accordance with the invention.

Figure 1:
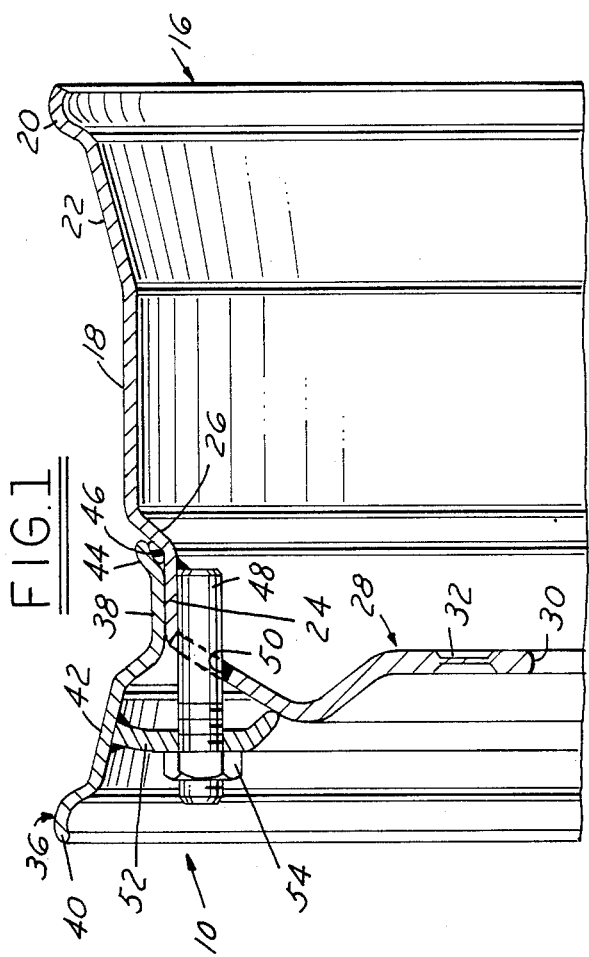
FIG. 1 is a fragmentary central axial and radial sectional view of a vehicle wheel which includes an integral rim and disc segment manufactured in accordance with and embodying the present invention.

In the following description and claims, directional adjectives such as "inboard", "outboard" and "outward" are used by way of description and not by way of limitation, and are taken with reference to preferred orientation of the invention illustrated in the drawings, and no undue limitations should be inferred therefrom where such directional descriptions are not essential to operation of the structural and functional features of the invention.

FIG. 1 illustrates a vehicle wheel assembly 10 as including a first rim segment 16 having a cylindrical rim base 18 and an inboard bead retaining flange 20 integrally projecting therefrom and coupled thereto by a bead seat 22. A circumferentially continuous cylindrical band 24 has a diameter which is less than that of rim base 18 and is coaxially integrally connected thereto by the radially outwardly and axially inwardly angulated shoulder 26. A circumferential array of axially extending air bleed passages or channels (not shown) are formed as radial depressions in the cylindrical outer surface of band 24 at preferred angular spacings of substantially 45°. A wheel mounting disc generally indicated at 28 is integral with an edge of band 24 remote from flange 22 and includes a hub opening 30 and a circular array of stud or bolt circle openings 32 for mounting wheel assembly 10 onto a vehicle in the usual manner. It will be noted that the central portion of disc 28 is of substantially uniform thickness to adjacent the juncture with band 24, at which juncture the thickness of the integral rim and disc segment 16 tapers to a second lesser substantially uniform thickness which extends through band 24, shoulder 26, rim base 18, bead seat 22 and flange 20.

Wheel assembly 10 further includes a second rim segment 36 which comprises a cylindrical hoop 38 adapted to be slidably and telescopically received over band 24, and an outboard bead retaining flange 40 integrally coupled to hoop 38 by the outboard bead seat 42. A lip 44 projects axially inwardly and radially outwardly from the flange-remote edge of band 38 for sealingly capturing in assembly against shoulder 26 an annular resilient O-ring seal 46. A plurality of threaded studs 48 are affixed as by welding internally of band 24 on rim segment 16 and project axially outwardly therefrom through corresponding openings 50 in disc 28. An annular clamping ring 52 has a radially outer edge welded to the internal surface of bead seat 42 and projects radially and axially inwardly therefrom to abut disc 28 inwardly of stud openings 50. A plurality of locknuts 54 are received over studs 48 for clamping rim segment 36 with integral clamp ring 52 onto rim segment 16, with O-ring 46 being captured in compression between lip 44 and shoulder 26. Certain features of wheel 10 illustrated in FIG. 1 and described hereinabove are disclosed in greater detail and are the subject of copending U.S. application Ser. No. 439,565 filed Nov. 5, 1982 and assigned to the assignee hereof. The present invention is directed to manufacture of integral rim and disc segment 16 and the improved product of such method.

FIGS. 2 and 3 illustrate a spinning chuck 60 which includes a head stock 62 mounted on a drive shaft 63. A tail stock 64 is movable axially with respect to head stock 62 so as to clamp a workpiece blank therebetween, and is rotatable conjointly with head stock 62 powered by drive shaft 63. A mandrel 66 is mounted on head stock 62. In the embodiment illustrated in FIGS. 2 and 3, mandrel 66 comprises three mandrel segments 68,70,72 which are assembled to each other so as to define an axially and radially outwardly facing mandrel surface 79 which corresponds to the desired inboard interior geometric contour of the integral rim and disc segment to be formed. In the embodiment of FIGS. 2 and 3, such contour corresponds to the contour of rim and disc segment 16 hereinabove described in connection with FIG. 1.

A first roller 74 (FIG. 2) is mounted for rotation on a slide (not shown) which is operably coupled to a programmable control mechanism 75 in the usual manner for controlling axial and radial motion of roller 74 during rotation of chuck 60 so as to engage and deform the periphery of a workpiece blank captured by the chuck in a controlled preprogrammed manner. The radial working surface 76 of roller 74, which engages a workpiece mounted in chuck 60, has a relatively large radius of curvature and is adapted for draw spinning the periphery of the workpiece blank in multiple passes as the latter is rotated and unsupported by mandrel 66. A second roller 78 (FIG. 3) is likewise rotatably mounted on an associated roller slide (not shown) and is operably coupled to programmable control mechanism 75 for controlled radial and axial motion of roller 78 with respect to chuck 60. The radial tip working surface 80 of roller 78, which is disposed to engage the periphery of a workpiece captured by chuck 60, has a lesser radius of curvature than does surface 76 of roller 74, and less than the radius of curvature of any bends in the desired geometric contour of the workpiece, and thus is adapted to finish the workpiece by deforming the same against the surface of mandrel 66.

Figure 4:
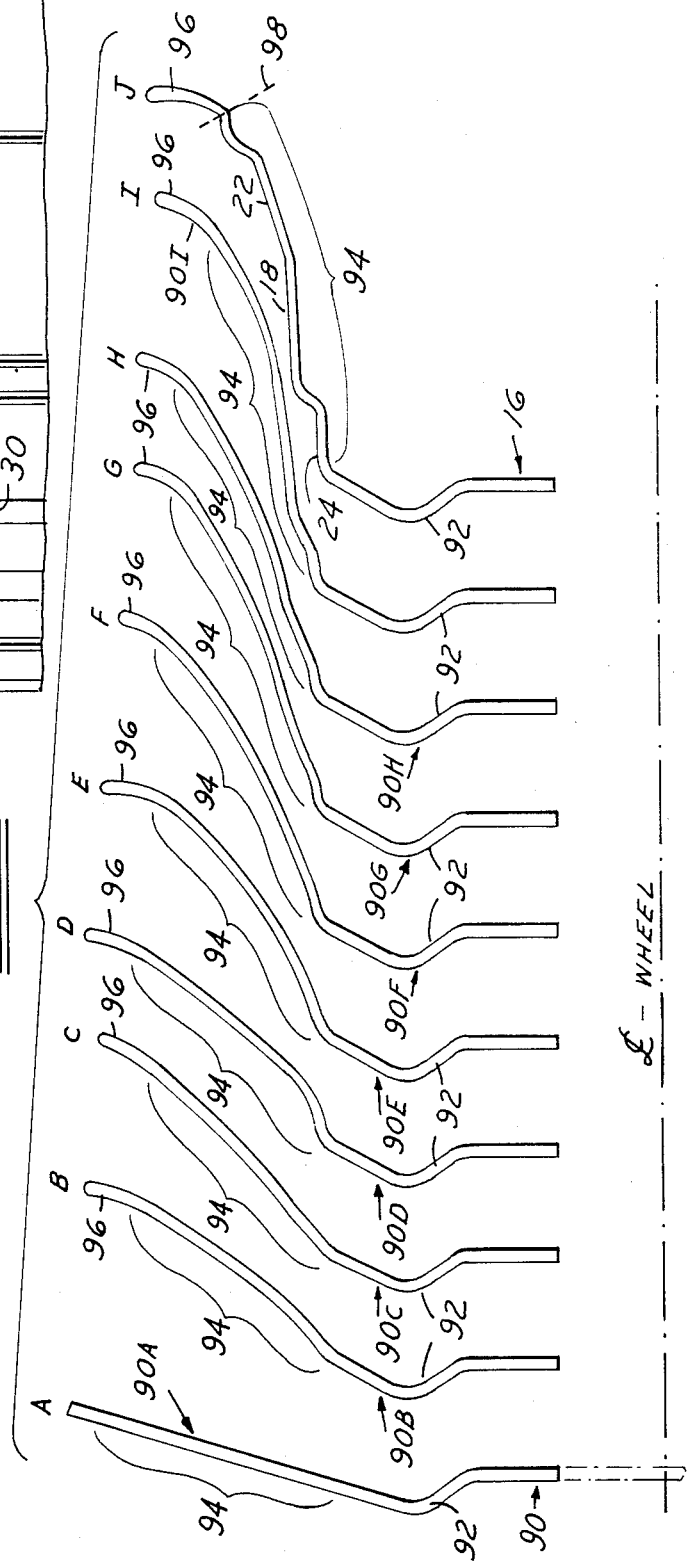
FIG. 4 is a schematic illustration of successive stages of manufacture in accordance with the invention as illustrated in FIGS. 2 and 3.

The method of forming integral rim and disc segment 16 in accordance with the present invention will now be described in greater detail in conjunction with FIGS. 2 and 3, and with additional reference to FIG. 4 which illustrates at A–J successive stages in practice of the invention. A preformed circular blank 90 (FIGS. 2 and 4) is first mounted on head stock 62, and the central portion of blank 90 is clamped thereagainst by tail stock 64 for coaxial rotation therewith. Blank 90, in the preferred implementation of the invention, is preformed in a blanking and bending operation from sheet stock and possesses a substantially uniform thickness throughout. Most preferably, blank 90 is constructed of grade SAE 945 high strength low alloy steel composition. It is preferred to preform blank 90 to possess an outward bend 92 which will fit over the nose 93 on mandrel 68. The periphery 94 of blank 90 extends axially and radially from bend 92 at a slight angle with respect to the radius from the axis of rotation of chuck 60 and at an acute angle with respect to the surface 79 of mandrel 66. In the specific embodiment of the invention illustrated in the drawings, the starting thickness of blank 90 is 0.200 inches, and the diameter (in flat state) of blank 90 is 24.875 inches.

With blank 90 so mounted in chuck 60, head stock 62 and tail stock 64 are rotated at high speed (e.g. 380 r.p.m. by shaft 63, and draw spinning roller 74 (FIG. 2) is brought into controlled engagement with blank 90. As chuck 60 is rotated, roller 90 is moved radially and axially through multiple passes in engagement with the periphery portion 94 of blank 90, while such peripheral portion is spaced from and unsupported by mandrel 66, so as to reduce the thickness contour of the blank periphery and simultaneously draw the blank periphery axially along and radially toward mandrel 66. The contour of the circular blank after each of these draw spinning passes is illustrated at B-I in FIG. 4, illustration A in FIG. 4 showing the blank 90 before spinning deformation. After the first draw spinning pass, that peripheral portion 94 which ultimately will form band 24, rim base 18, bead seat 22 and flange 20 (FIG. 1) is thinned slightly, with some material being drawn into a thickened band 96 at the extreme outer peripheral edge of blank 90. During the second pass from B to C, peripheral portion 94 is thinned further and is oriented at an angle of about 45° with respect to the blank centerline. Successive passes to and between stages D, E, F, G and H result in further thinning of the blank peripheral portion 94, further thickening of the band 96 and further elongation in the axial direction and reduction in the radial direction. After the final pass at stage I, the blank 90 possesses substantially uniform thickness over the entire peripheral portion 94. In the embodiment of the invention illustrated in the drawings, the thickness of peripheral portion 94 at stage 90I ranges between 0.110 and 0.115 inches.

As previously indicated, such draw spinning operation is accomplished by moving roller 74 axially and radially in a controlled manner while in engagement with blank workpiece. Typically, each roller pass would involve motion radially and axially outwardly from adjacent to bend 92, although one or more reverse passes, i.e. radially and axially inwardly while in engagement with the workpiece, may be employed where appropriate. Such reverse passes tend to turn the blank toward the die surface with a lesser amount of thinning than with a forward pass, and thus are most useful where lower thickness reduction is desired. In the particular embodiment illustrated in the drawings, the roller pass between stages C and D was such a reverse pass, and all other passes were forward passes.

Upon completion of the draw spinning operation at stage 90I (FIGS. 2 and 4), the peripheral portion 94 of the circular blank is closely adjacent to but spaced from the surface 79 of mandrel 66, and is of substantially uniform thickness. At this point, draw spinning roller 74 is moved out of engagement with the workpiece. With chuck 60 still rotating at high speed (e.g. 380 r.p.m.), finishing roller 78 (FIG. 3) is brought into engagement with the workpiece so as to deform the workpiece against mandrel surface 79 to obtain the final desired geometric contour of the rim and disc segments. Preferably, this finish spinning deformation process is performed in a single pass of roller 78 across the workpiece blank without substantial additional thinning of the workpiece, although some minor finish-thinning may be implemented where required. The resulting blank contour 90J (FIGS. 3 and 4) has the final desired thickness and geometric contour of integral rim and disc segment 16, with the thickened band 96 projecting from the radial outer edge thereof. Band 96 may thus be severed at 98 (FIGS. 3 and 4), and the free edge appropriately finished so as to form the final desired contour of bead retaining flange 20 (FIGS. 1 and 4).

Parameters for controlling axial and radial motion of draw spinning roller 74 and finishing roller 78 during each pass so described have been obtained, in accordance with the present invention, by empirical trial and error techniques. This trial and error process typically involves two phases. The first phase involves attempts to draw-spin the starting blank to approximately the geometry of stage 90I without controlling the thickness geometry and without experiencing any blank failures. Part failure during the draw spinning operation usually involves either edge cracks or buckles around the periphery of the blank, or circumferential splitting at any portion of the blank which is overdrawn or overworked in a particular pass. Edge cracks or buckles typically occur when the edge of the blank is overworked or reduced in diameter without proper support from the lesser diameter portion of the blank. It is considered important in overcoming edge cracks and buckles to form the enlarged peripheral band 96 during the draw spinning operation, which band may later be removed or discarded. Stated differently, it is considered preferable not to attempt to draw the blank such that the extreme peripheral edge of the blank is at the thickness of the remainder of the blank periphery following the draw spinning operation during which the blank is unsupported by the mandrel. Although this procedure produces some waste in each preformed blank, it materially reduces overall failures, and thus produces less waste in the long run. Circumferential failures occur when the severity of a pass or distance between successive pass steps is too great. Typically, circumferential failures may be reduced by using several mild passes in place of a few severe passes.

The second phase of the empirical trial and error process for obtaining the draw-spinning roller control parameters involves adjustment of the control parameters resulting from the first pass, with or without additional passes, to obtain desired uniform thickness in blank peripheral portion 94. Such thickness control may be obtained by combining several control factors. Blank size may be selected to increase or decrease required thinning. A severe pass step causes increased thinning, while a mild pass step results in a lesser amount of thinning in that pass. Likewise, the spacing between passes and the length of each pass over the blank periphery affect not only the amount of thinning which takes place during each pass but the number of passes required. Although the negative end curl at the blank periphery 96 illustrated at 90B–90I increases the amount of work required for each next-following pass, a thickened negative end curl is preferred for reasons previously set forth, i.e. peripheral support to prevent edge cracks and buckles. A reverse pass, wherein the draw spinning roller moves radially and axially inwardly while in engagement with the workpiece, is particularly useful for reducing the radius of the blank in a particular pass with minimum thinning.

When such trial-and-error process results in a blank stage 90I approaching desired final geometry, and preferably at final desired thickness contour, the control parameters of the finishing pass (FIG. 3) are empirically obtained. It may occur that the thickness contour at stage 90I after completion of the draw-spinning operation is not precisely uniform, and the finishing pass may involve some minor thickness adjustment. However, it is intended in accordance with the invention that the finishing pass be primarily a geometry-altering pass wherein the blank periphery is deformed radially against mandrel surface 79 but not substantially thinned (or thickened).

When the above-described trial and error process yields a rim and disc segment of desired thickness and geometric contour, the associated parameters for controlling motion of both the draw spinning roller and the finishing roller may be stored in programmed controller 75 for effecting automated control of the spinning operation of the invention. It will be appreciated, of course, that any change in desired thickness or geometric contour of the final rim and disc segment would typically require modification of the control parameters, with the amount of modification required being dependent in part on the severity of the desired contour changes.

The invention so described yields an integral rim and disc segment having an enhanced strength-to-weight ratio. The specific wheel shown in the drawings was developed for an application wherein both endurance and weight were of primary consideration. The wheel was tested against a cast aluminum wheel of comparable contour, and against an all-steel wheel formed by a different process and having a 25% greater thickness at 18–20. The cast aluminum wheel, although lighter in weight, did not possess sufficient endurance when subjected to severe long-term testing. The all-steel wheel did not perform as well as the wheel of the invention, and was substantially heavier than the wheel of the subject process. It is believed that this enhanced strength-to-weight ratio results in substantial part from the cold working of the wheel segment rim base, bead seat and flange portions during successive draw-spinning passes in accordance with the invention.

It will also be appreciated that, although the invention has been disclosed in connection with manufacture of vehicle wheels, specifically integral wheel rim and disc segments, the principles of the invention may also be applied to manufacture of other articles. Indeed, annular articles other than wheel rims may be formed in accordance with the invention and then severed from the central unformed portion of the blank, which can then be discarded.

The invention claimed is:

1. A method of forming an annular article of preselected cross sectional geometry and thickness contours from a circular blank of greater thickness than said preselected thickness contour comprising the steps of
   (a) clamping the central portion of said blank in a spinning chuck having a convex mandrel surface which corresponds to said preselected geometry contour, such that the peripheral portion of said blank is spaced from said surface,
   (b) draw spinning said peripheral blank portion by engaging said peripheral portion with a draw spinning roller while said peripheral portion remains spaced from and unsupported by said mandrel surface so as to obtain controlled thickness reduction in said unsupported peripheral blank portion to said preselected cross sectional thickness contour, and then
   (c) spin-forming said peripheral portion against said surface with a second roller without substantially altering the thickness contour thereof so as to obtain said preselected geometry contour.

2. The method set forth in claim 1 wherein said step (b) is carried out by engaging said roller against said peripheral blank portion in multiple passes, each of which reduces the radius of said peripheral portion with respect to said surface and alters the thickness contour thereof from that following the preceding said pass.

3. The method set forth in claim 2 wherein said thickness reduction is so controlled as to obtain substantially uniform thickness across at least a major portion of said blank peripheral portion following the last of said multiple passes, with said peripheral portion still being spaced from and unsupported by said mandrel surface.

4. A method of forming a one-piece vehicle wheel disc and rim segment which includes disc and rim portions of preselected cross sectional geometry and thickness contours, said method comprising the steps of:
   (a) providing a wheel spinning chuck which includes a mandrel having an exterior surface which corresponds to said preselected geometry contour,
   (b) providing a circular blank having a central portion with a thickness contour equal to said preselected thickness contour of said disc portion and a peripheral portion with a thickness contour that is greater than said preselected thickness contour of said rim portion,
   (c) clamping the central portion of said blank in said chuck with said blank peripheral portion being spaced axially and radially from said mandrel surface,
   (d) draw spinning said peripheral blank portion with a first spinning roller with the entire said blank peripheral portion engaged by said first roller being spaced from and unsupported by said mandrel surface so as to reduce the thickness contour of said peripheral portion to said preselected thickness contour by drawing material in said peripheral portion radially and axially of said chuck while said peripheral portion remains out of engagement with said mandrel surface, and then
   (e) spin-forming said peripheral blank portion against said surface with a second roller without substantially altering the thickness thereof so as to obtain said preselected geometry contour.

5. The method set forth in claim 4 wherein said step (d) is carried out by engaging said blank peripheral portion with said first roller in a plurality of discrete roller passes, during each of which axial and radial motion of said first roller is so controlled as to reduce said thickness contour while increasing axial dimension of said peripheral portion.

6. The method set forth in claim 5 wherein at least some of said passes comprise motion of said first roller axially and radially away from said central blank portion while in engagement with said peripheral portion so as to draw stock material in said peripheral portion to the periphery thereof.

7. The method set forth in claim 6 wherein said step (d) comprises the step of drawing said blank periphery to possess substantially uniform thickness throughout the major portion thereof, with the peripheral edge of said blank being thicker than said major portion, and wherein said method comprises the additional step of:
   (f) removing said peripheral edge from said blank.

8. A method of forming a vehicle wheel section which includes a disc portion and an integral rim portion extending axially from said rim portion, with said disc and rim portions having preselected thickness and geometric contours, said method comprising the steps of:
   (a) clamping a preformed circular blank in a spinning chuck having an outer mandrel surface corresponding to said preselected geometric contour, such that the peripheral portion of said blank is spaced axially and radially from said surfaces,
   (b) draw spinning said blank peripheral portion to said preselected thickness contour by engaging said peripheral portion with a spinning roller and oscillating said roller radially and axially in multiple passes across said peripheral portion with said peripheral blank portion being spaced from and unsupported by said mandrel surface during and after each said pass, and with said peripheral portion progressively decreasing in radial dimension and increasing in axial dimension toward said surface during each said pass, and then
   (c) spin forming said peripheral portion against said surface to said preselected geometric contour by moving a second roller in a single pass across said peripheral portion.

9. The method set forth in claim 8 wherein said step (a) includes the step of providing a disc blank of substantially uniform thickness and of HSLA steel composition.

* * * * *